United States Patent [19]

Zhang

[11] Patent Number: 4,529,084
[45] Date of Patent: Jul. 16, 1985

[54] SCRAPER UNIT FOR AN ENDLESS BELT

[75] Inventor: Jiashan Zhang, Beijing, China

[73] Assignee: Hosch Fordertechnik GmbH, Ruhrstrasse, Fed. Rep. of Germany

[21] Appl. No.: 480,386

[22] Filed: Mar. 30, 1983

[30] Foreign Application Priority Data

Mar. 30, 1982 [DE] Fed. Rep. of Germany ....... 3211626

[51] Int. Cl.³ .............................................. B65G 45/00
[52] U.S. Cl. .................................................... 198/499
[58] Field of Search ............... 198/497, 499; 15/256.5, 15/256.6

[56] References Cited

U.S. PATENT DOCUMENTS 3,674,131 7/1972 Matson ........................... 198/497 X
4,359,150 11/1982 Bowman et al. ................ 198/499 X Primary Examiner—Jeffrey V. Nase
Attorney, Agent, or Firm—Reed, Smith, Shaw & McClay

[57] ABSTRACT

The invention has to do with a system of elements for keeping a scraper blade in position under an endless conveyor belt, the system being made up of a support, a spring joint and a cross piece running across and under the belt. There is an element bracket so that the unit made up of these parts may be rocked about an axis running in the length direction of the belt. In this way it is possible to put every scraper edge on a blade into a position in which it is truly parallel to the lower face of the endless belt in very simple way.

8 Claims, 9 Drawing Figures

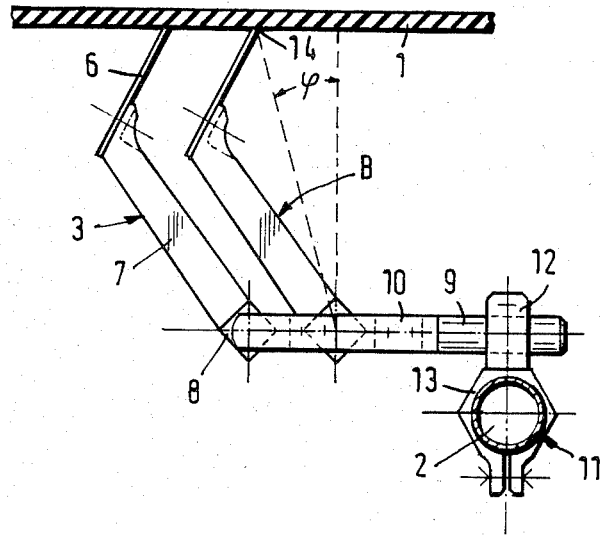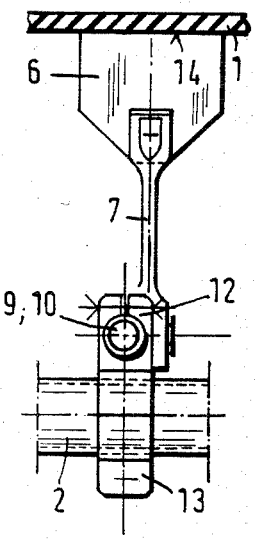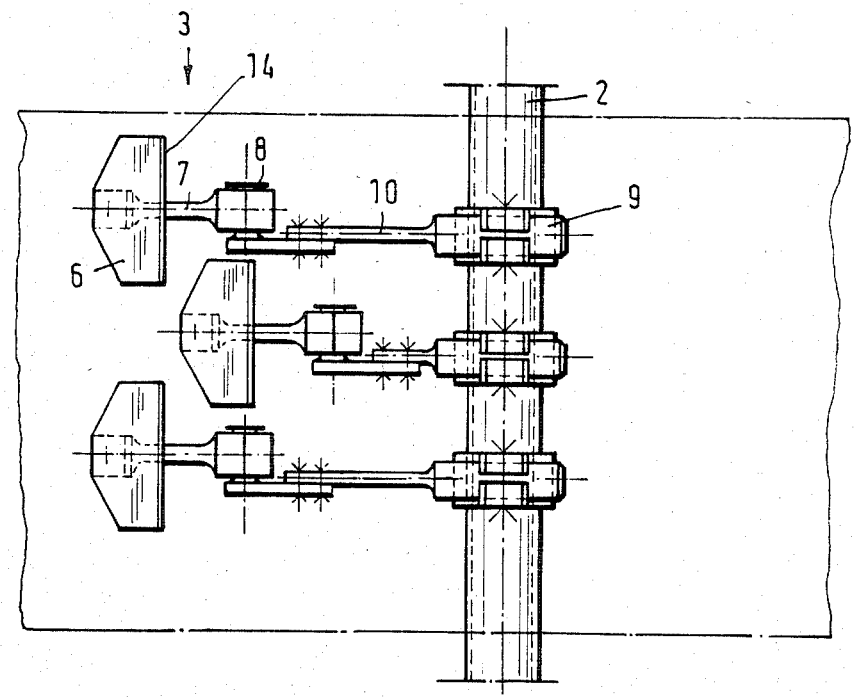

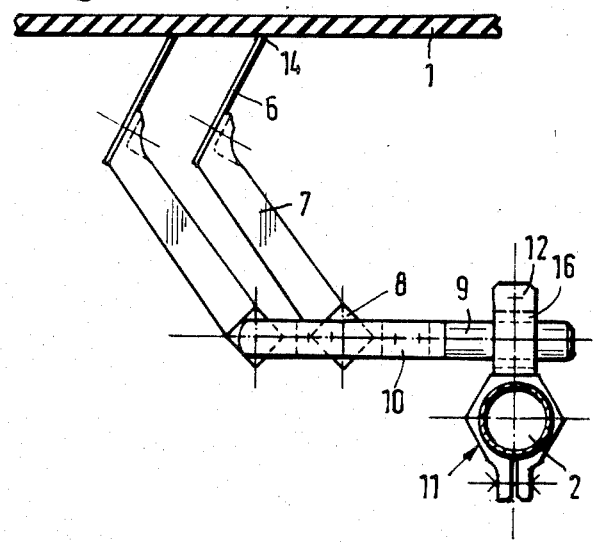
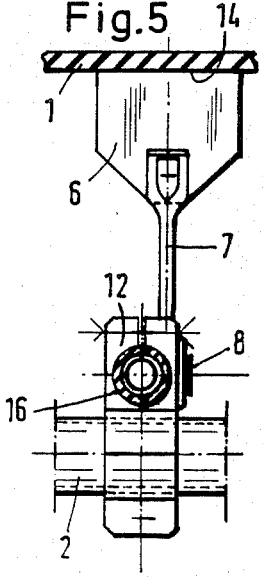
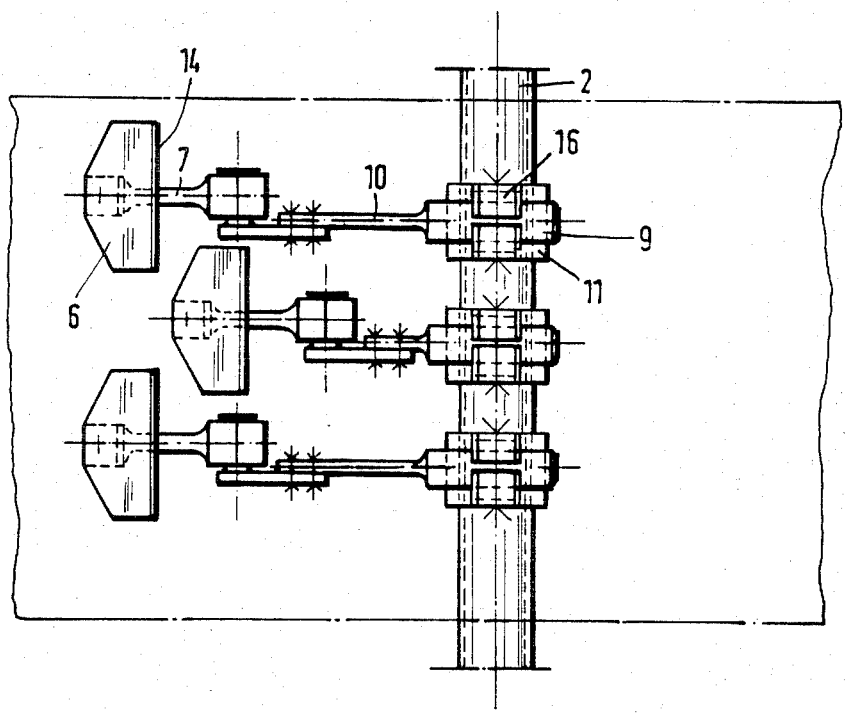

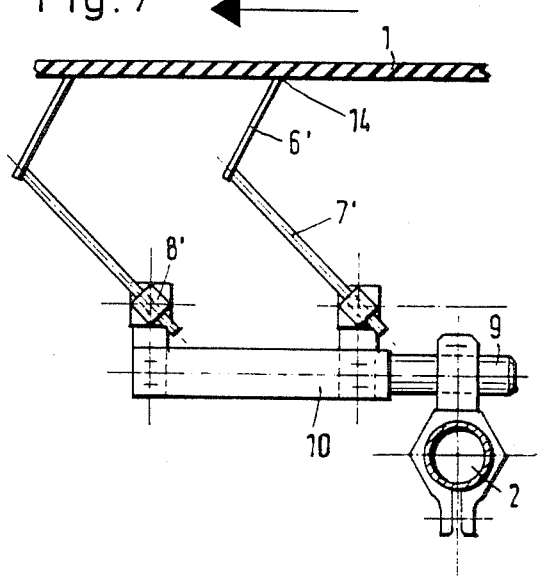
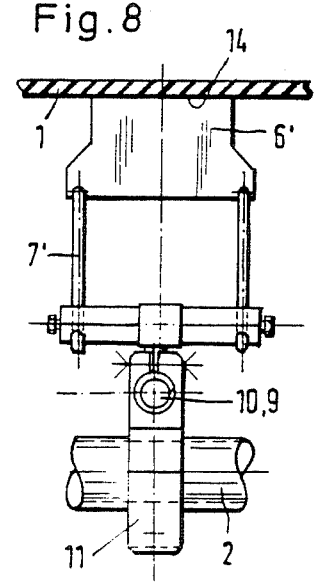
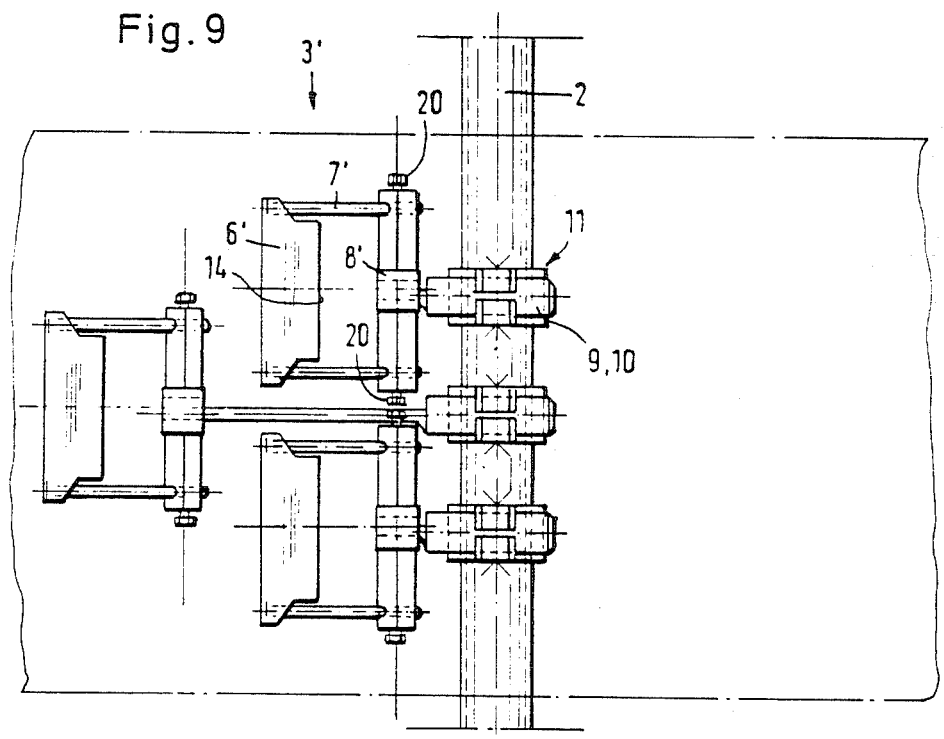

SCRAPER UNIT FOR AN ENDLESS BELT

BACKGROUND OF THE INVENTION

The present invention is with respect to a scraper unit for endless belts made up of a number of elements each having a scraper blade, a support and a spring joint, that are fixed to a cross piece running across the belt with the help of an element bracket.

DISCUSSION OF THE PRIOR ART

Such scrapers have been in existence for a long time and are used for cleaning endless belts in material handling plant, that is to say for clearing any material sticking to the surface of the belt. In this respect it is important that the separate blades have the property of on the one hand producing a full cleaning effect and on the other hand of moving elastically out of the way of any solid object that is hardly able to be dislodged from the belt surface and then moving as quickly as possible back into the scraping or cleaning position.

It is only natural that the scraper blades undergo a certain degree of wear, that in the case of the handling of highly abrasive materials is likely to be relatively heavy. It is for this reason and because of the chance of a blade fouling the belt and being bent round thereby that regular adjustment of the blades is necessary. Such adjustment is done by unscrewing a clamping screw, used for fixing the blade (that has a slot therein) in question on the support, till the blade is loose enough. It has been seen from experience that the adjustment of the blade in relation to the lower side of the belt has to be within very tight limits, and more specially it is necessary to see that the scraping edge of the blade is parallel to the lower face of the belt.

So far much trouble has been experienced in connection with adjustment of the blades in the first place and then adjusting them later as part of upkeep work on the belt system. This is because on the one hand on doing up the clamping screw tight, the parts are likely to be moved out of the position of adjustment they have been moved into during doing up the screw, while on the other hand it is generally hard to do up the screw because of the spring joint of the support, that is to say because the support will give way and be moved out of position on using a spanner on the screw. A last point is that the screw is generally hard to get at because of its pointing towards the lower face of the belt; furthermore the screw is in the path of scrapings coming from the lower face of the belt and the adjustment work is likely to be unpleasant as long as the belt is running.

GENERAL OUTLINE OF THE INVENTION

It is for this reason that one purpose of the invention is that of designing a scraping system of the sort noted, the adjustment of whose blades is relatively simple.

A further purpose of the invention is that of designing such a system making adjustment readily possible even when the belt is in operation.

For effecting these and further purposes in the present invention the element bracket is joined to the cross piece by a clamping connection that may be undone and which makes possible stepless adjustment about an axis running in the length direction of the belt.

It will be seen from this that the suggestion made by the invention is that normally there is no adjustment to the elements and their brackets and the adjustment is in fact to take place at the connection between the element bracket with the cross piece. On the one hand this point of adjustment is clear of the path of scrapings coming down from the belt, while on the other it is generally simple to get at, and furthermore it is possible to have at this point a clamping joint, for example using a cylindrical rod and a pipe coupler, that may be adjusted finely and without any danger of loss of the adjustment when it comes to doing up the screw.

It is along these lines that it is possible to get a parallel adjustment of the scraper edge of each blade in relation to the lower side of the belt in the first place and to keep such parallelism later when upkeep is done. A further point is that adjustment of the force or preloading of every blade on the belt's lower side is necessary, this being done by moving the cross piece nearer to the lower face of the belt or by rocking the element bracket, and for this reason every element, in an upward direction. It is best if the clamping connection between every element bracket and the cross piece is in the form of a two-eyed or double coupler, whose one ring is placed round the element bracket and whose other ring is placed round the cross piece that is in the form of cylindrical pipe. In this case each element may be adjusted separately to see that it is parallel and is resting with the desired force against the belt.

In keeping with an important further development of the invention the clamping connection between each element bracket and the cross piece is made elastic, that is to say so as to give a resilient function, with respect to oscillating motion about said axis, this being made possible for example by the use of a flexible bearing or rubber torsion spring made up for example of two coaxial bushes with rubber bonded therebetween. Such units are marketed under the tradename of Silent Bush. Such a system makes possible an automatic adjustment of the scraper so as to remain parallel to the lower face of the belt, if the belt is displaced in any way or if the outer face of the belt is not even and flat but has blisters or is irregular in some other way. The adjustment is then so made that in the neutral or "home" position as controlled and fixed by the positioning spring, the scraper is generally parallel to the lower side of the endless belt and it is only the likely unevenness in the lower side of the belt that is taken care of by the flexible bearing.

For limiting the amount of dirt picked up by the scraper unit of the present invention it is best for each blade to be guided by using two supports and for the scraping edge as such of the blade to be made narrower than the distance between the two supports of one and the same blade. With this design one may be certain of the scrapings from the belt dropping down between the supports and there will be no building up of deposits on the parts of the scraper. A further useful effect in this connection, that is to say keeping the unit free of dirt, may be produced if the point at which scraping takes place is placed further from the axis of turning within each spring joint on each element in such a way that the scrapings go down through a free space within the unit and into a box placed thereunder.

A description will now be given of some working examples of the invention that are to be seen in the figures.

LIST OF DIFFERENT VIEWS OF THE FIGURES

FIG. 1 is a side elevational view of a scraper unit in keeping with a first working example of the invention.

FIG. 2 is an end-on elevational view of part of the scraper unit as in FIG. 1.

FIG. 3 is a view looking upwards towards the lower side of an endless belt with a scraper unit of the present invention placed thereunder.

FIG. 4 is a view looking in the same direction as in FIG. 1 of a further example of the invention.

FIG. 5 is a view, looking in the same direction as in FIG. 2, but this time of the second working example of the invention.

FIG. 6 is a view like that of FIG. 3 of this further example.

FIG. 7 is a view, looking in the same direction to that of FIG. 1 but of a third functioning example of the scraper unit of the invention.

FIG. 8 is a view on the same lines as FIG. 2 of this further example.

FIG. 9 is a view like that of FIG. 3 of this further form of the invention.

DETAILED DESCRIPTION OF WORKING EXAMPLES OF THE INVENTION

In FIG. 1 the reader will see the first working example of the invention. Under an endless belt 1 there is a cross piece 2 made of cylindrical tube whose supports have not been made part of the present figure. A number of elements 3 are fixed to the cross piece 2. Each such element 3 is made up of a blade 6, a support 7 and a spring joint 8 in the form of a rubber torsion spring. While the one part of the spring joint 8 is joined to the support 7, the other part is joined to an element bracket 10, that is, at the end next to the cross piece 2 in the form of a cylindrical rod 9.

The unit made up of the elements 3 and the element supporting bracket 10 is plugged into the small, upper eye 12 of a double coupler 11, the large eye 13 being placed round the cross piece. The length of the brackets 10 varies from one element 3 to the next one (FIG. 3) so that the blades are out of line (offset) with each other or staggered for the purpose of scraping the surface of the belt fully across its width without any gaps.

Using the system to be seen in FIGS. 1 to 3 exact adjustment of each blade 6 is possible so as to be truly in the desired position. To this end, the first step is adjustment of the force with which each blade is biased against the belt 1. To do this the cross piece 2 is adjusted upwards or downwards or by undoing and doing up the large eye 13 of the double coupler 11 the angle of the bracket 10 in relation to the belt 1 is charged responsive to the distance of each spring joint 8 from the lower face of the belt 1 is changed. In this respect the spring joint 8 is twisted to different degrees and in this way the force of the blade against the belt is changed.

It is best for the adjustment made to be such that the scraper edge 14 on each blade 6, as seen in the direction of motion of the belt 1, is in front of the top end of an upright line running from the spring joint 8 to the lower side of the endless belt 1, or, to put it differently, this upright may make an angle with the line running from the spring joint to the scraper edge, such angle φ having a value of 5° to 45° the best value therefore being roughly 20°. This makes certain that the scrapings from the belt 1 are not dropped down onto the spring joint 8 but into the free space to the back thereof, this free space only being crossed by the supports 7.

After adjustment of the force or preloading effect with which the blades are biased against the endless belt 1, the parallelism of the edge 14 of each blade 6 in relation to the belt 1 is adjusted. This adjustment is highly important for the efficiency of cleaning of the endless belt 1. For every new adjustment any light seen through a gap between the scraper edge and the endless belt 1 may be used as a guide, adjustment being undertaken till the scraper edge is fully and evenly rested against the belt 1. For making such an adjustment the small eye 12 of the double coupler 11 is unscrewed sufficiently to permit manual adjustment and the unit made up of the element and the element bracket 10 is turned or rocked till the desired condition, as noted, has been produced. Thereafter the small eye is tightened up again; at this point any further adjustment may be made if the blade has become worn or if it has been moved out of position by fouling the belt 1.

As part of a further development of the invention the last-named form of adjustment with respect to parallelism of the scraper edge 14 in relation to the lower face of the endless belt is, to a certain degre, made automatic. To this end the clamping connection between the cylindrical rod 9 of the element bracket 10 and the small eye 12 of the double coupler is made up of a flexible bearing or torsion spring 16, as for example one marketed under the trade name of Silent Bush, that although it has a certain self-centering effect, lets a certain degree of rocking out of position about the middle axis of the cylindrical rod 9 take place, that is to say making possible rotation about an axis running in the direction of the endless belt under or over the cross piece 2 (see FIGS. 4 to 6).

In the event of the adjustment of a blade 6 not being truly parallel to the lower face of the endless belt 1, or if the blade 6 has gotten out of the parallel position or if the endless belt 1 is running for the time being or permanently at a different angle in relation to each blade 6, the unsymmetrical load acting on one side of the scraper edge 14 will give rise to a rocking moment about the middle axis of the cylindrical rod 9 against the effect of the torsion spring 16. After the automatic adjustment into a new equilibrium position the scraper edge 14 will now be lined up roughly or truly parallel to the lower face of the endless belt 1, the corrected or restoring force being dependent on the size of the force with which the blades are acting on the lower face of the belt 1, and on other factors.

In FIGS. 7 to 9 the reader will see a further working example of the invention, in the case of which every blade 6' is kept in place by two supports 7', that are spaced from each other. Each support 7' is joined by a clamping connection with the spring joint 8', the parts being clamped tight with a clamping screw 20. Another point is that in this form of the invention the scraper edge 14 is made narrower than the distance between two supports 7' of one and the same element 3'. It is for this reason that the scrapings coming from the lower side of the endless belt will not drop down onto the supports 7' so that there will be no accumulation of deposits here. It will be seen that generally this form of the apparatus will keep itself cleaner.

It will be clear that adjustment of the force of the blades 6' against the lower face of the endless belt 1 may be done not only at the clamping connection using the clamping screw 20 but furthermore by rocking the element bracket 10 bodily about the cross piece 2. In addition to these useful effects the system makes it simpler for a blade 6' together with the support 7' (that is as a rule permanently fixed thereto) to be taken off and a new one put in its place.

The cross piece is normally kept in position by threaded upright rods fixed to the frame of the endless belt, this making adjustment possible, or the support for the cross piece 2 is a floating support system, for example with the use of a parallelogram linkage with weights or springs loading it. Taking a general view it will in fact be seen that the apparatus of the present invention is best placed to the back of the bend roller of the belt 1, but before any tightening roller as frequently placed near the outermost bend roller. It is here that there will be the least shaking of the belt so that the apparatus of the invention is more specially efficient.

In the working examples of the invention of which a description has been given so far, the cross piece 2 is in each case placed under the element bracket 10. By turning the double coupler 11 upside down so that the large eye 13 is on top of the small eye 12, the cross piece 2 may furthermore be placed nearer to the belt 1 while the rest of the parts of the apparatus are kept unchanged, this being best in all cases in which the unit has to take up little space.

If the lower face of the endless belt is very soiled and if large amounts of such dirt are scraped therefrom, it will be very important to have the system as in FIGS. 7 to 9, that is to say a system in which there are two supports 7' for each blade 6' so that the scrapings will be able to be dropped down freely without anything in their way. Because this part of the design is so important for certain uses to which the invention is put, it is claimed by itself whatever the design of the connection between each element bracket and the cross piece.

I claim:

1. In a conveyor belt cleaner unit having a support arm with a first end connected to a cleaner support element mounted transverse to the direction of belt travel and a second arm end having secured thereto a belt cleaner blade and pinned at the blade edge opposing the edge which contacts the conveyor belt, the improvement comprising:
   (a) a torsion spring joint comprised of an elastomeric material pivotally interposed between the one movable end of said support arm and the opposing edge of said blade, and adapted to provide pressure contact, displacable and restorable without manual intervention, against the belt by the cleaner blade edge so that it remains substantially parallel to the underside of the belt despite the occurrence of belt surface imperfections that temporarily displace said blade edge from continuous belt contact, and
   (b) a coupling element disposed between said support arm and said cleaner support element consisting essentially of a rigid fixture having an upper and lower section which sections are disposed at right angles to each other with the upper section having a first substantially cylindrical bore therethrough sized for clampable accommodation to the other end of the scraper support arm, and the lower section having a second substantially cylindrical bore therethrough sized for clampable accomodation of said transversely mounted support element.

2. The unit of claim 1, wherein said spring joint further comprises dual coaxial bushings spaced apart and separated by an elastomeric spacer which is bonded to said bushings at their interfaces.

3. The unit of claim 1, wherein the angle of displacement of the cleaner blade from being perpendicularly oriented to the underside of said belt is in the range of five to forty-five degrees and the blade displacement from perpendicular is opposite to the direction of travel of said belt surface.

4. The unit of claim 3, wherein said angle is about 20°.

5. The unit of claim 1, wherein the blade support elements comprises two rod-like elements disposed at opposing lateral ends of the blade, each rod element being pinned at one end to the blade edge opposing the contact edge and being pinned at its other end to the outer end of a torsion-spring-mounted transverse bar pinned to said coupling element.

6. The unit of claim 5, wherein the lateral distance between the substantially parallel rod-like elements exceed the length of the blade edge in contact with the conveyor belt.

7. In a conveyor belt cleaner unit having a support arm with a first end connected to a cleaner support element mounted transverse to the direction of belt travel and a second arm end having secured thereto a belt cleaner blade which is pinned to the blade side adjacent the blade edge opposing the edge which contacts the conveyor belt, the improvement comprising:
   (a) a first torsion spring comprised of an elastomeric material pivotally interposed between the one movable end of said support arm and the opposing edge of said blade,
   (b) a coupling element disposed between said support arm and said cleaner support element consisting essentially of a rigid fixture having an upper and lower section which sections are disposed at right angles to each other with the upper section having a first substantially cylindrical bore therethrough sized for clampable accommodation to the other end of the scraper support arm, and the lower section having a second substantially cylindrical bore therethrough sized for clampable accommodation of said transversely mounted support element, and
   (c) a second torsion spring disposed about the other end of said arm and within the orifice of the clamp element of said support element, and adapted also to provide that automatic and resilient adjustment of the cleaner blade edge so that it remains substantially always in contact with the underside of the belt despite the occurence of belt surface imperfections that temporarily displace said blade edge from continuous belt contact.

8. The unit of claim 7, wherein the support arm is adapted to be oscillated within a small arc while clamped by said coupling element to accommodate movement of the cleaner blade pinned to the other end of said support arm.

* * * * *